Patented Nov. 15, 1932

1,887,995

UNITED STATES PATENT OFFICE

ACHILLE CONZETTI, OF BASEL, SWITZERLAND, ASSIGNOR TO THE FIRM: J. R. GEIGY S. A., OF BASEL, SWITZERLAND

MANUFACTURE OF STRONGLY BASIC AZO-DYESTUFFS

No Drawing. Application filed July 28, 1928, Serial No. 296,102, and in Germany August 6, 1927.

The present invention relates to the manufacture of strongly basic monoazo-dyestuffs and consists in converting nitrated primary and secondary amines of the benzene series by successive treatment with chloracetyl-chloride and a body of the pyridine group, into a basic body containing the group

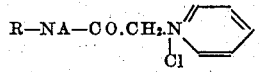

wherein R represents an aryl radical of the benzene and naphthalene series and A represents hydrogen, alkyl or aryl of the benzene series, reducing the nitro group of the body thus obtained, diazotizing and coupling same with azo components of the benzene and naphthalene series and phenylmethylpyrazolone. Pyridine may be the preferable base to be used in this process, but also quinoline or a derivative of pyridine is usable.

The new dyestuffs in the form of their hydrochlorides are more or less easily soluble in cold water and have the properties of fast basic dyestuffs, that is to say they dye cotton with a tannin mordant intense and fast tints.

As compared with the known strongly basic azo-dyestuffs which contain the strongly basic group as a quaternary nitrogen attached either directly or through the $CH_2$-group to the benzene ring, the dyestuffs of this invention are characterized by containing the group $-NH.CO.CH_2$ as a bridge.

Since each free amino-group can be converted into this strongly basic group by smooth reaction there is the possibility of obtaining a very large number of new combinations, especially also by introducing several such strongly basic groups into the dyestuff molecule.

By suitable choice of a dyestuff which is fast to light and contains free amino-groups and is not useful in dyeing, there may be obtained by the process of this invention dyestuffs which dye with a tannin-mordant and yield on cotton tints of high fastness to light, complete fastness to washing, complete fastness to acids and alkali and yielding pure white discharges.

Also dyestuffs can be obtained which yield on weighted silk tints which are quite fast to washing and yield pure white discharges. Similarly, good dyeings may be produced on leather and jute.

*Example 1.*—13.8 kilos of para-nitraniline are dissolved at 80° C. in 100 litres of toluene and 13 kilos of chloracetylchloride are gradually added. By heating for several hours at 115° C. all the hydrochloric acid is expelled and on cooling the chloracetyl-para-nitraniline separates completely in the form of pale yellow hard crystals almost insoluble in boiling water and melting at 182° C.

The chloracetyl-derivative is dissolved in 100 litres of pyridine and the solution is gradually heated, whereby the mass solidifies to a thickish crystal mass owing to separation of the product of reaction and heat is evolved. The whole is heated for a short time to boiling and then cooled, whereby the pyrido-acetyl-para-nitraniline is completely separated in crystalline form. The product may be obtained pure by crystallization from boiling water in the form of long white needles which melt at 267° C. It is very sparingly soluble in cold water.

The pyridination may be procured more advantageously by heating the chloracetyl-para-nitraniline in 70 litres of water +7.9 kilos of pyridine for about 1 hour to boiling, whereby a complete solution is slowly formed. On cooling there is formed a magma of large crystals which are the hydrochloride of pyrioacetyl-para-nitraniline.

By reduction with iron and acetic acid in known manner there is obtained smoothly an aqueous solution of pyridoacetyl-para-phenylene-diamine of the probable formula:

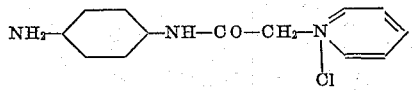

For producing the dyestuff a feebly acid solution of 26.35 kilos of pyridoacetyl-paraphenylene-diamine in 200 litres of water and 16 kilos of concentrated hydrochloric acid is diazotized by means of a solution of 6.9 kilos of sodium nitrite in the usual manner. After neutralization of the mineral acid by means of sodium acetate 14 kilos of crystallized sodium acetate are added and into this diazo-solution there is run one of 18.2 kilos of 1-phenyl-3-methyl-5-pyrazolone of 95 per cent strength in 500 litres of water and 13.4 kilos of caustic soda lye of 30 per cent strength, and the whole is then heated to 40° C.

The dyestuff is completely precipitated; it is filtered and dried. It is fully soluble in water, dyes tannin-mordanted cotton pure yellow and weighted silk a yellow which is fast to washing and very fast to light.

*Example 2.*—The diazo-solution obtained in known manner from 7.15 kilos of alpha-naphthylamine is neutralized by means of sodium acetate and is run into a solution of 16 kilos of N-pyridoacetyl-2:7-aminonaphthol of the formula:

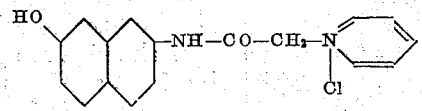

in 400 litres of water containing 7 kilos of crystallized sodium acetate, which solution was prepared hot but cooled before the coupling operation.

The dyestuff dyes tannin-mordanted cotton pure blue-red and its dyeings on weighted silk are fast to washing and very fast to light.

The N-pyridoacetyl-2:7-aminonaphthol is made by chloracetylating 2:7-aminonaphthol in aqueous solution and heating the chloracetyl-2:7-aminonaphthol having the formula

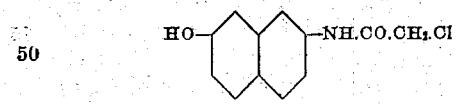

in pyridine or preferably in aqueous suspension with pyridine. There is thus obtained N-pyridoacetyl-2:7-aminonaphthol in the form of hard, coarse, light-yellow crystals.

The dyestuff obtained with alpha-naphthylamine has the following formula:

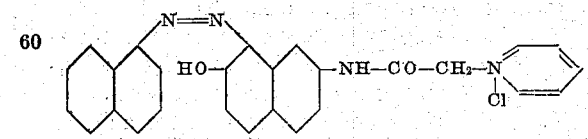

The product is almost insoluble in cold water but easily soluble in hot water. The solution in caustic soda lye is deep yellow.

*Example 3.*—16.6 kilos of ethyl-para-nitraniline are dissolved in 25 kilos of toluene at the temperature of the water-bath; while stirring well 12.5 kilos of chloracetylchloride are dropped into the solution and the latter is stirred for 2 hours at 115° C. After cooling, the separated crystalline chloracetyl-ethyl-para-nitraniline, which is formed in good yield, is filtered. It melts at 144–146° C. and probably has the formula:

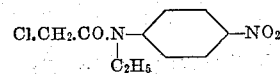

This nitro-derivative is heated for a short time in pyridine or preferably in aqueous suspension with pyridine, whereby there is obtained in quantitative yield the pyridoacetyl-ethyl-para-nitraniline of melting point 216° C. and of the probable formula:

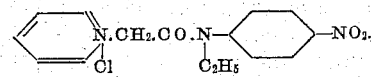

From this latter compound by reduction by means of iron and acetic acid there is obtained in good yield the pyridoacetyl-ethyl-para-phenylenediamine.

The reduction liquor containing 29.15 kilos of this substituted para-phenylenediamine is diazotized by means of 30 kilos of concentrated hydrochloric acid and 6.9 kilos of sodium nitrite. The mineral acid is neutralized by means of sodium acetate and more crystallized sodium acetate amounting to 15 kilos is added. Into this diazo-solution is run 14.4 kilos of beta-naphthol in 200 litres of water and 13 kilos of caustic soda lye of 30 per cent. strength.

The dyestuff thus produced is very easily soluble and dyes tannin-mordanted cotton an orange fast to washing and light and weighted silk a yellow orange which yields a white discharge and is of good fastness to light.

*Example 4.*—10.7 kilos of para-nitrodiphenylamine are heated in 50 litres of toluene to 80° C. To this mixture, while stirring well, 6.5 kilos of chloracetyl chloride are added by drops and heating is continued for 2 hours at 115° C. until all hydrochloric acid has been dispelled. After cooling, the beautiful crystalline chloracetyl-para-nitrodiphenylamine is filtered. Its melting point is 114–115° C. and its probable formula:

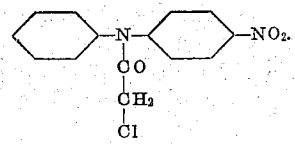

This nitro-derivative is heated for a short time in pyridine or preferably in aqueous suspension with pyridine, whereby there are obtained in excellent yield pure white, lustrous crystals of pyridoacetyl-para-nitrodiphenylamine of melting point 203–204° C. and of the probable formula:

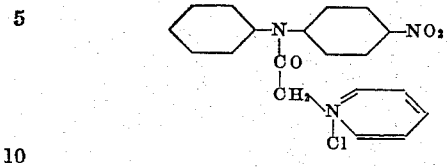

By the known method of reduction by means of iron and acetic acid there is obtained from this compound the pyridoacetyl-para-aminodiphenylamine.

A solution of this last-named base containing 34 kilos is diazotized by means of 30 kilos of concentrated hydrochloric acid and 6.9 kilos of sodium nitrite. The mineral acid is neutralized by means of sodium acetate and more crystallized sodium acetate is added to the amount of 15 kilos. Into this diazo-solution is then run a solution of 14.4 kilos of beta-naphthol in 200 litres of water and 6.5 kilos of caustic soda lye of 30 per cent. strength.

The dyestuff thus produced is soluble in water and dyes tannin-mordanted cotton orange-red tints fast to washing and light. It dyes weighted silk red-orange which yields a white discharge and is satisfactorily fast to light.

Further examples of dyestuffs obtainable in accordance with this invention:

body of the pyridine group into a basic body containing the group

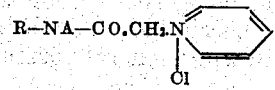

wherein R represents an aryl radical of the benzene and naphthalene series and A represents hydrogen, alkyl or aryl of the benzene series, reducing the nitro group of the body thus obtained, diazotizing and coupling same with an azo coupling component of the benzene and naphthalene series and phenylmethylpyrazolone.

2. A process for the manufacture of strongly basic monoazo-dyestuffs, consisting in converting a diazotizable compound of the benzene and naphthalene series by successive treatment with chloracetyl-chloride and pyridine into a basic body containing the group

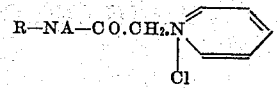

wherein R represents an aryl radical of the benzene and naphthalene series and A represents hydrogen, alkyl or aryl of the benzene series, diazotizing and coupling same with an azo coupling component of the benzene and naphthalene series and phenylmethylpyrazolone.

3. A process for the manufacture of strongly basic monoazo-dyestuffs, consisting

| Dyestuff from | Appearance of the dyestuff | Solution in water +sodium acetate +acetic acid | Solution in concentrated sulphuric acid | Dyeing on tannin-mordanted cotton |
|---|---|---|---|---|
| Pyridoacetyl-para-phenylenediamine→acetoacetic-anilide | Greenish - yellow powder. | Green-yellow | Green-yellow | Greenish-yellow |
| Pyridoacetyl-chloro-para-phenylenediamine→beta-naphthol | Orange-red powder | Orange-red | Blue-red | Red |
| Pyridoacetyl - chloro-para - phenylenediamine→phenyl - CH₁-pyrazolone. | Orange powder | Pure yellow | Yellow | Yellow |
| Pyridoacetyl-meta-amino-ortho-anisidine→beta-naphthol | Light red powder | Scarlet red | Red-violet | Blue-red |
| Pyridoacetyl - meta - amino - ortho - anisidine→ di - chloro - phenyl-CH₁-pyrazolone. | Orange-red powder | Orange-yellow | Red-brown | Orange-yellow |
| Pyridoacetyl-1:4-naphthylenediamine→beta-naphthol | Dark violet powder | Dark red | Blue | Dark red |
| Pyridoacetyl - ortho - nethoxy - para - phenylenediamine→ beta-naphthol. | Light red powder | Scarlet-red | Blue-red | Red |
| Pyridoacetyl - ortho - amino - para - toluidine→phenyl - CH₁-pyrazolone. | Orange-yellow powder | Orange-yellow | Yellow | Orange-yellow |
| Pyridoacetyl - para - phenylenediamine→pyridoacetyl - 2:7 - aminonaphthol. | Brownish - red powder | Orange-red | Ruby-red | Red |
| Para-toluidine→pyridoacetyl-2:7-aminonaphthol | Red powder | Orange-red | Blue-red | Red-orange |
| Aniline→pyridoacetyl-2:7-aminonaphthol | Light red powder | Orange-red | Blue-red | Red-orange |
| Para-toluidine→pyridoacetyl-1:4-aminonaphthol | Red powder | Blue-red | Blue-red | Blue-red |
| Aniline→pyridoacetyl-1:4-aminonaphthol | Blue-red powder | Ruby-red | Bluish-red | Bluish-red |
| Dimethyl-acetyl-amino-para-phenylenediamine→beta - naphthol. | Brown-red powder | Scarlet-red | Blue-red | Red |
| Pyridoacetyl - ethyl - para- m e t h y l - meta - phenylenediamine→beta-naphthol. | Brick-red powder | Orange | Blue-red | Orange |

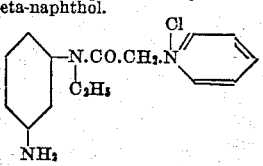

What I claim is:

1. A process for the manufacture of strongly basic monoazo-dyestuffs, consisting in converting nitrated primary and secondary amines of the benzene series by successive treatment with chloracetyl-chloride and a body of the pyridine group into a basic body containing the group in treating mononitranilines with chloracetyl-chloride, then treating the body thus obtained with pyridine and with a reducing agent capable of reducing the nitro group to the amino group, diazotizing the product thus obtained and coupling same with an azo coupling component of the benzene and naphthalene series and phenylmethylpyrazolone.

4. The strongly basic monoazo-dyestuffs obtained as herein before described and having the following general formula:

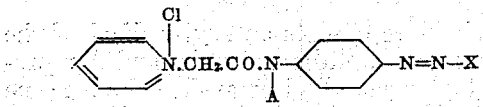

wherein A represents hydrogen, alkyl or aryl of the benzene series and X an azo coupling component of the benzene and naphthalene series or phenylmethylpyrazolone, said azo-dyestuffs being in form of their hydro-chlorides more or less easily soluble in water and having the properties of basic dyestuffs dyeing tannin-mordanted textiles intense and fast tints.

In witness whereof I have hereunto signed my name this 16th day of July 1928.

ACHILLE CONZETTI.